United States Patent Office 2,855,666
Patented Oct. 14, 1958

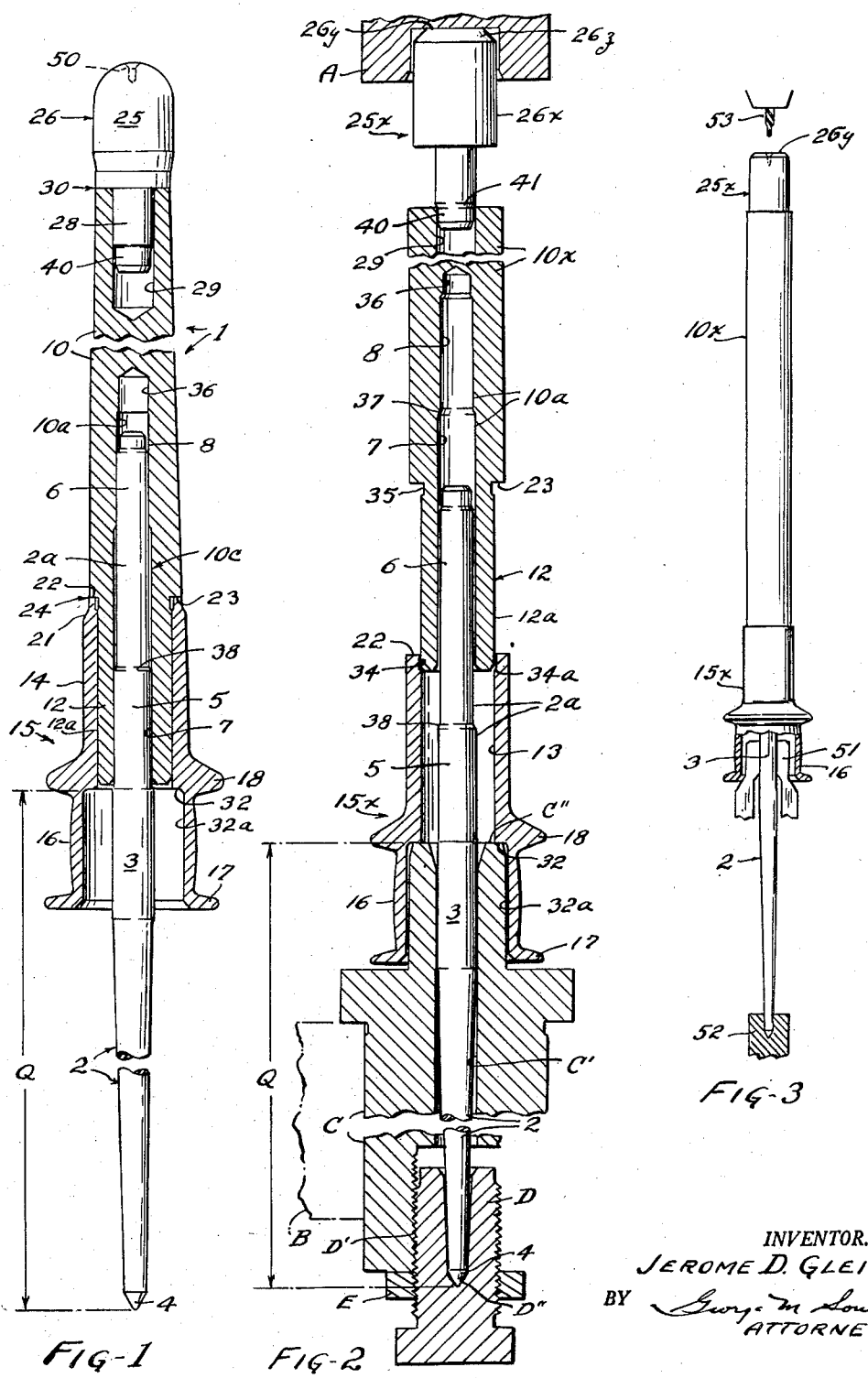

2,855,666

METHODS OF PRODUCING TEXTILE MILL SPINDLES

Jerome D. Gleitz, Pepper Pike Village, Ohio, assignor, by mesne assignments, to Curtiss-Wright Corporation, Marquette Metal Products Division, Cleveland, Ohio, a corporation of Delaware Original application February 16, 1954, Serial No. 410,499, now Patent No. 2,775,859, dated January 1, 1957. Divided and this application October 14, 1954, Serial No. 462,145

3 Claims. (Cl. 29—525)

This application is a division of my application Serial No. 410,499 filed February 16, 1954, now Patent 2,775,859, January 1, 1957, entitled, Textile Mill Spindle.

The invention relates to an improved method of making a spindle comprising a composite metal blade and whorl unit a considerable portion of which is of suitable light weight metal, (e. g. strong aluminum alloy, hereinafter aluminum), for the purpose of enabling the unit effectually to support and drive so called "paper tube type" (hereinafter tube type) bobbins while minimizing mass, hence handling cost and power requirement. The herewith illustrated spindle comprises a steel shaft, a steel whorl and a bobbin-supporting light weight metal barrel, which latter preferably includes a separately manufactured, high wear resisting, bobbin-driving tip member.

Composite spindles of the type outlined above, for most effectual use, must be highly resistant to deflection forces; dynamically balanced; smooth as to surface finish and without exposed sharp corners or open joints, and must permanently maintain certain critical dimensional relationships within close limits as will be explained. The present method, indicating the principal object of the invention, provides for producing composite metal spindles (meeting the above requirements) in high quantity and at relatively low cost as compared to methods previously used to my knowledge. In the accompanying drawing:

Fig. 1 is a fragmentary central sectional view showing the composite spindle according to my said application.

Fig. 2 is a similar view illustrating the spindle components temporarily assembled into alignment preparatory to being force-fitted together, the view also showing portions of the assembling tools.

Fig. 3 is a reduced scale view showing the partly finished spindle, resulting from the pressing operation by the tools of Fig. 2, as mounted for forming a center socket at the top end of the composite structure.

In the spindle assembly or unit 1, as shown in Fig. 1, shaft 2 is of high quality, thoroughly heat treated, hard steel. Portion 3 of the shaft is shown as cylindrical and is appropriately finished for support by the upper bolster bearing (not shown) of the complete spindle and bolster assembly. The shaft tapers downwardly to a footstep-bearing-engaging generally conical end portion 4. The upper end portion 2a of the steel shaft 2, beyond the bearing surface 3, has two relatively different or stepped diameter generally cylindrical portions 5 and 6 which are in interference fitting relationship to respective surface portions 7 and 8 of an axial bore 10a in the aluminum barrel 10.

The aluminum barrel 10 is preferably "forging quality" alloy for high strength and hardness, yet capable of being accurately machined and finished. The barrel 10 is of slightly tapered form on its exposed surface and has a reduced diameter cylindrical lower end portion 12 the principal peripheral surface 12a of which is in interference fitting relation to a mating cylindrical bore 13 in the upper or acorn portion 14 of a steel whorl 15.

The steel whorl 15 has a driving-band-engaging or pulley portion 16 defined in part by lower and upper circular flanges 17 and 18. The upper flange portion 18 of the whorl is of relatively heavy cross section, radially, and lies in radial alignment with the lower end of the reduced diameter portion 12 of the barrel 10, which associated regions of the whorl and barrel must, so far as possible, be effectively prevented from relative axial movement. The whorl acorn 14 on its outer surface 20 is adapted for loose centering engagement by the lower end of the tube type bobbin (not shown) and gradually tapered as at 21 to form a bobbin-piloting smooth ramp. Above the ramp the top end surface or rim 22 of the whorl acorn very firmly abuts the shoulder surface 23 of the aluminum barrel 10 all around the barrel to form a tight butt joint 24. The peripheral surfaces of acorn and barrel adjacent the joint 24 are flush and smooth.

At the top of the barrel 10, for supporting and driving the bobbin, is a wear resisting tip 25, preferably of steel or operatively equivalent material, shown in the form of a plug having a smooth tapered peripheral surface 26 near its top end and a generally cylindrical reduced diameter shank portion 28 in interference fitted relationship to the wall surface of an axial cylindrical socket or bore 29 in the barrel 10. The tight, flush butt joint 30 is essentially similar to the joint 24 at the top of the whorl acorn portion 14. The spindle assembly as a whole has a very important axial dimension, namely that indicated at Q (lower conical shaft tip to upper inner wall or shoulder surface 32 of the whorl). That dimension must be held within a few one thousandths of an inch in order that the whorl portion 16 will be at proper height above the spindle rail for engagement with the driving band and so that the same surface 32 can be used as a base or reference point in locating all the bobbin supporting portions of the spindle at proper height.

In the construction according to Fig. 1 the upper end portion 2a of the shaft 2 and the receiving bore surfaces in the aluminum barrel are so interrelated dimensionally that the shaft is more forcibly gripped by the barrel metal in a region close to the bearing engaging surface portion 3 of the shaft (press fitting couple 5, 7) than at any other portion of the shaft, and the gripping regions or areas of press fitting contact between the shaft and the metal of the barrel (5, 7 and 6, 8) are of limited axial extent appropriate to press fitting of steel into aluminum. Further the steel and aluminum are out of contact with each other for a considerable distance along the shaft above and below the joint 24 as indicated or defined by clearance space 10c, Fig. 1. Distinctive advantages of the illustrated axial spacing of gripping areas and specifically the provision of clearance space 10c in respect to operation of the spindle are fully explained in my said parent application. Therefore, generally, only the characteristics of the construction which are pertinent to or are advantageous in the making of the spindle (present subject method) will be pointed out below.

In Fig. 2, the steel shaft 2 is the only spindle component which is completely finished prior to the assembly operation depicted by that view. The barrel 10 of Fig. 1 (as described above) is represented in Fig. 2 by cylindrical barrel blank 10x ("barrel member," in claims), the whorl 15 by semi-finished whorl blank 15x ("whorl member," in claims), and the tip or plug 25 is represented by semi-finished plug blank 25x.

The barrel blank 10x of Fig. 2 is a cylindrical aluminum bar which has been fully end-finished and provided with substantially aligned fully finished bores at its two ends. Whorl blank 15x is fully formed as to its band-engaging lower end portions 17, 18 etc., inner acorn bore surface 13, and bolster-collar-accommodating bore 32a, the latter terminating in axial annular shoulder or step 32. Plug member or blank 25x is only roughly formed as to upper external diameter or head portion 26x, and the top end surface 26y of the blank is flat. Chamfer 26z is provided on the head 26x as a pilot to facilitate entrance into socketed adapter or head A on the ram or plunger (not shown) of a suitable power press (e. g. hydraulic).

B, in Fig. 2, represents, diagrammatically, the platen of the press which carries above mentioned adapter A. C, partially shown in vertical central section, is a rigid tubular metal workholder or sleeve suitably fixed to the platen B of the press, substantially in axial alignment with the adapter A. Bolster bearing surface 3 of the shaft 2 has a fairly snug slip fit in bore C' of workholder sleeve C, and the footstep end portion 4 of the shaft freely enters a block D rigidly supported by the workholder sleeve. The top end portion C'' of sleeve C, shown with suitable internal and external piloting chamfers, constitutes a support and lateral guide or positioning member on the platen for the whorl blank 15x. When the whorl blank is placed in the press, said blank is precisely centered with the shaft 2 (assumed already in position as shown) by snug slip-fitting sliding engagement of the outer periphery of sleeve portion C'' with the inside diameter surface 32a of the whorl blank 15x.

Shoulder surface 32 of the whorl blank rests upon the top end of workholder sleeve portion C'', and provision for precisely locating that shoulder 32 relative to the conically pointed, footstep-engaging lower end portion 4 of the shaft 2 comprises, as shown, a threaded connection D' for lower shaft-centering and supporting block D. The shaft, as placed in the bore of sleeve C, is stopped by a conical socket surface portion D'' of the block D; and the threaded connection D' enables axial adjustment and precise retention of dimension Q (Figs. 1 and 2) as by tight seating of locknut E against the lower end of rigidly mounted sleeve C. The bottom flange 17 of the whorl blank 15x is maintained out of contact with the underlying adjacent top surface of sleeve C to avoid deformation of the band-engaging portions of said blank. The shaft-centering socket surface D'' in the adjustable block D is designed, as by having a slightly greater included angle than that of the footstep end 4 of the shaft, so as to engage the lower end portion of the shaft at the outer limits of the rounded terminal portion of the shaft. The above described fixture operates to hold the upper end portion 2a of shaft 2 and the whorl blank 15x concentric with each other and in axial alignment with plunger adapter portion A of the press, meanwhile holding the shaft and barrel blank firmly against relative axial movement.

The aluminum barrel blank 10x, which is next to be put into place for assembly by operation of the press, has its reduced diameter portion 12 preferably chamfered inside and out for rough-piloting purposes, as will be evident; and adequate piloting relative to the whorl blank 15x is obtained by reason of an axially short cylindrical counterbore 34 in the upper end of the acorn-forming portion of the whorl blank. The counterbore 34, the bottom end of which serves as a temporary stop shoulder is a gradually sloping bevel surface 34a, to avoid scuffing of the barrel shank by the relatively hard whorl blank metal during the press fitting. Counterbore 34 is made only slightly larger than the outside limit for the outer diameter of barrel shank cylindrical surface 12a (easy slip fit). Mating surfaces 12a and 13 are so dimensioned as always to effect a tight press fit, and the mating surfaces are fairly smoothly finished. Preferably, the shank surface 12a of the barrel blank is ground cylindrically to the grinder relief undercut 35 adjacent shoulder 23, and the bore surface 13 of the acorn portion 14 of the whorl is smooth reamed cylindrically, each to appropriate tolerance dimensions for press fitting of aluminum and steel.

The axial bore 10a in the barrel blank 10x has three diameters two of which form the finished surface (bore) portions 5 and 8 already described and which are connected by a smooth relatively long taper or bevel surface 37. These surfaces (7, 8 and 37) can be made substantially concentric with each other by concurrent finish formation with a single stepped diameter reamer, guided by a carefully machined pilot hole the inner (upper) end portion of which extends, as at 36, somewhat beyond the position which the upper end of spindle shaft 2 will occupy in the finished spindle (see Fig. 1).

Cylindrically formed spindle shaft portions 5 and 6 actually have a very small difference in diameter (about .005") the drawing being greatly exaggerated in this and similar respects. These surfaces 5 and 6 are finish machined, as by centerless grinding, in substantially absolute concentricity (and with a smooth connecting circular ramp or relatively long taper 38 to avoid cutting the aluminum as the shaft is pressed into final position). The pairs of mating surfaces 5—7 and 6—8 have (with the preferred selection of materials, finishes and method of press fitting assembly, further discussed below) an interference or press fitting difference in diameter on the order of .001", .002".

While the barrel blank 10x is temporarily resting on the whorl blank acorn (at the slip fit telescoping and abutment connection involving surfaces 12a, 34 and 34a, as shown in Fig. 2) the upper, slightly reduced diameter portion (surface 6) of the shaft, functions as a very effectual easy slip fit connection between the shaft and barrel blank to hold the latter in substantial alignment with the shaft axis, hence the plunger adapter A of the press. Again, the clearance between shaft portion 6 and barrel bore 7 is greatly overemphasized on the drawing. Ramp 38 is barely perceptible upon casual inspection of shaft 2.

It might be noted, in view of the next above paragraph that if the shaft-receiving bore 10a in the barrel blank 10x were to be made with a uniform diameter throughout its effective length (which might possibly save a little expense in tooling although rendering inspection more difficult) and a slightly greater diameter were to be provided at shaft surface portion 5 than at surface portion 6 (so that the passing of portion 6 into the bore would not impair the lower bore surface in which shaft portion 5 must be especially tight), then the shaft and bore could not possibly be so manufactured as to enable piloting hand placement of the barrel blank over the shaft into the position shown by Fig. 2, and further so that the upper end of the shaft would be certain to have an adequately tight fit in the bore above the whorl acorn as required for true running operation of the spindle. Additionally, if one were to depend solely upon a difference in diameter between portions such as 5 and 6 of the shaft (again assuming a cylindrical unstepped receiving bore in the barrel blank 10x for such shaft portions 5 and 6), then in order to assure that both portions 5 and 6 would be adequately tight in such single diameter bore, the difference in shaft diameters would either be too small to admit of specifying practical manufacturing tolerances or the lower portion 5 would have to be so large relative to the receiving bore in the barrel that said lower portion 5 would have to cut or scuff its way through the aluminum rather than to force its way through by slightly compressing or locally expanding the aluminum (as done in the practice of the present invention), assuming that the pressing operation could actually be performed without damaging the assembly beyond repair.

Referring further to the tip blank 25x as positioned in and on the top end of the barrel blank 10x, Fig. 2, the shank portion 28 of the plug is enabled to easily enter the smooth bore or socket 29 of the barrel blank a short distance by reason of a reduced diameter pilot end portion 40 on the shank, which is made slightly smaller than the minimum specified limit of the socket diameter (at 29) and of sufficient length to hold the blank 25x stably in upright position prior to press fitting. Shoulder 41 is a smooth taper to avoid cutting or scuffing of the aluminum in bore 28. The interference between tip shank 28 and its receiving bore 29 in the barrel blank is preferably slightly greater than any of the other force fitting relationships earlier described, since the barrel metal around the shank 28 is not confined as it is at the bottom of the barrel by the whorl acorn.

Suitable lubricant or compound, such for example as liquid soap, is applied to the shaft 2 and barrel blank 10x, (e. g. by dipping) just prior to insertion of those parts into the press. As the press is progressively but continuously closed on the axially assembled blanks, insertion of the shank 28 of tip blank 25x into its receiving bore 29 is the first press fitting operation to be performed since the involved diameters are relatively small; the reduced diameter barrel shank 12 then enters the main bore 13 of the whorl acorn 14; then the shaft portions 6 and 5 enter their interfitting bores 8 and 7; and finally the joints 30 (tip 25 vs barrel) and 24 (whorl acorn vs barrel shoulder 23) are closed tightly, completely around the spindle axis. Since the only possible axial interrelationships between the barrel blank 10x, the whorl blank 15x and the shaft 2 have been established by precision support of the whorl blank and the shaft on and in the platen of the press (dimension Q), axial uniformity of product is insured.

As the smoothly tapered shoulder 38 on the shaft 2 enters its bore 7 in the barrel blank 10x the tubular, reduced diameter, wall of aluminum at the lower end of the barrel blank becomes subjected simultaneously to radially oppositely acting forces which (assuming appropriate selection of alloy and treatment thereof as is well known) effect sufficient local cold working of the aluminum, further to harden and strengthen it at the critical region most likely to be subjected to concentrated stress and strain in resisting lateral flexure of the spindle top portion when the shaft 2 is firmly supported at bearing surface 3.

It will be seen from the above that since all the tightly interfitted parts in the above described construction are basically cylindrical, the parts can be tightly fitted together in any desired precise axial relationship, whereas if interfitted taper surfaces had been used, then it would not only be extremely difficult to manufacture the parts with accurately mating smooth taper surfaces as necessary but there could be only one axial relationship of each pair of taper fitted parts, not a choice of several as in the herewith disclosed arrangement.

While great care is exercised in forming the shaft-receiving and tip-receiving bores 10a and 29 in the opposite ends of the barrel blank in true axial alignment, and centrally of said blank, it is obvious that absolute concentricity cannot be assured in high quantity production. Accordingly the precision formed shaft 2, the lower portions of which determine the axis of rotation of the spindle in its bolster, are now used, as generally illustrated by Fig. 3, in placing a tool center socket 50 or its operative equivalent in or on the outer end face 26y of the tip blank. Characters 51 and 52 are intended to indicate suitable coaxial supports holding the bolster-bearing-engaging surface 3 and the conically pointed footstep end portion 4 of the shaft 2 in true alignment with center socket forming tool 53. The spindle is afterward mounted in another machine tool, in accordance with accepted practice, using the center socket 50 and the precision formed portions of the exposed end of the shaft 2 (as will be apparent without requiring discussion), to machine the described assembled spindle blank parts as to size and smooth finish. The smooth flush joint at 24 hereof (Fig. 1), at the top of the whorl acorn 14, and the smooth flush joint 30 between the barrel 10 and the bobbin driving tip 25 (Fig. 1), are formed, during the final turning and finishing treatment to remove the excess metal, substantially as described in patent to H. Gleitz et al. 2,582,325, issued January 15, 1952 to the assignee of the present application.

I claim:

1. In the force fitting of a steel shaft into an axial bore in the lower end of a barrel member of light weight metal and a tubular steel whorl member around a reduced diameter lower end portion of the barrel member to form basically a rigid composite metal spindle adapted to support tube type bobbins; supporting the lower end of the shaft and a downwardly facing surface of the whorl in approximately concentric radially spaced apart relationship to each other thus against axial downward movement, placing the barrel member with its bore in telescoping easy slip fitting relation to the unsupported end of the shaft, thus temporarily aligning the barrel member with the whorl member and shaft, and then, in one continuous operation, pressing identical regions of the barrel member relative to its longitudinal axis into interference fitting relationship to the shaft and simultaneously into interference fitting relationship to the whorl member the interference fitting in each case being accomplished substantially by radial displacement only of the barrel metal or without substantial displacement of that metal axially of the barrel member.

2. In making a composite metal spindle for textile mills, partly by force fitting, the spindle comprising a steel shaft adapted for support by a bolster, a light weight metal barrel member having an axial bore open at one end to receive the shaft, and a steel whorl member having an axial bore to receive an end portion of the barrel member; the method comprising, forming a generally smooth cylindrical surface on a portion of the shaft between its ends in such oversize relation to an open end portion of the bore of the barrel member as is appropriate for force fitting without substantial axial displacement of metal and forming a relatively smaller diameter end portion on the shaft adapted for easy slip fitting connection with said open end portion of the bore of the barrel member, forming a generally smooth external cylindrical surface on the barrel member radially opposite said open end portion of the bore of the barrel member, said external barrel member surface being in oversize relationship to the bore of the whorl member appropriate for force fitting without substantial axial displacement of metal, supporting the shaft and whorl member in generally concentric radially spaced apart relationship and against relative axial movement, placing the barrel member in telescoping slip-fitting relationship to said relatively smaller diameter end portion of the shaft to align the barrel member with the shaft and whorl member, and progressively applying axial pressure on the free end of the barrel member so as to bring the spindle components simultaneously into a desired axial relationship while simultaneously cold working external and internal surfaces of the metal wall of the barrel member.

3. The method of forming a composite metal textile mill spindle blade of the type wherein a portion of a steel shaft member and a radially adjacent tubular portion of a steel whorl member embrace between them a tubular base portion of a bobbin-supporting barrel member made of light weight metal, said method comprising the formation of approximately smooth cylindrical surfaces on the shaft and in an axial bore of the barrel member respectively with diameter differences appropriate for tight forced interference fitting of those members together without requiring substantial axial displacement of the barrel member metal from its original position on the barrel member, and the formation of smooth cylindrical surfaces externally of the barrel member and internally of the whorl member with respective diameter differences appropriate for tight forced fitting of those members together without requiring substantial axial displacement of the barrel member metal from its original position, the method being particularly characterized by supporting the shaft member and barrel member approximately concentrically of each other and with their said cylindrical surface portions in axially fixed relative position and axially coextensive for a considerable distance axially of the members, and simultaneously forcing the barrel member into interference fitting relationship to said surface portions of the shaft member and barrel member.

References Cited in the file of this patent

UNITED STATES PATENTS

| | | | |
|---|---|---|---|
| 162,008 | Baker | Apr. 13, | 1875 |
| 1,776,615 | Boothman | Sept. 23, | 1930 |
| 1,837,312 | Arms | Dec. 22, | 1931 |
| 2,006,525 | Thal | July 2, | 1935 |
| 2,181,343 | Reimschissel | Nov. 28, | 1939 |
| 2,490,594 | Madden | Dec. 6, | 1949 |
| 2,536,618 | Wood | Jan. 2, | 1951 |
| 2,609,254 | Harris | Sept. 2, | 1952 |
| 2,636,254 | Gunning | Apr. 28, | 1953 |

FOREIGN PATENTS

| | | | |
|---|---|---|---|
| 498,786 | Germany | July 29, | 1928 |